Patented July 28, 1925.

1,547,624

UNITED STATES PATENT OFFICE.

ERNEST WOODHOUSE SMITH AND THOMAS CAMPBELL FINLAYSON, OF LONDON, ENGLAND.

MANUFACTURE OF SUSPENSIONS OF IRON COMPOUNDS.

No Drawing.   Application filed December 5, 1924. Serial No. 754,216.

*To all whom it may concern:*

Be it known that we, ERNEST WOODHOUSE SMITH and THOMAS CAMPBELL FINLAYSON, both subjects of the King of Great Britain, residing in London, England, have jointly invented a certain new and useful Improved Manufacture of Suspensions of Iron Compounds, of which the following is a specification.

An alkaline suspension of ferric hydroxide such as is used for purifying gases, is generally made by neutralizing a solution of a ferric salt, such as the sulphate, by means of a solution of an alkali, usually sodium carbonate or by adding solid sodium carbonate, or other alkali to the solution of ferric salt. The ferric compound, conveniently called hydrated ferric oxide, thus produced, forms a voluminous suspension or gel, which can be treated only with difficulty in filter presses, so that its separation from liquors and other suspended solid is difficult.

It is an object of the present invention to produce hydrated ferric oxide which can easily be separated from liquid in which it is suspended, or from other solid matter suspended with it in a liquid, and possesses a relatively high chemical activity.

The invention consists in mixing together suitable quantities of a soluble iron compound and an alkali, both in the solid state, and bringing together water and the mixture. A reaction occurs whereby hydrated ferric oxide or hydrated ferrous oxide, or ferrous carbonate is produced, according to the state of oxidation of the iron compound used and the particular alkali employed. The oxide and/or carbonate remains suspended, or is easily suspended, in the water in which the reaction occurs, and if the suspension is present in the ferrous condition it is oxidized to the ferric condition by any convenient oxidizing agent for instance by blowing air through the suspension. The amount of alkali can either be just sufficient to cause the complete decomposition of the iron salt, or alternatively excess of alkali may be employed.

Assuming that ferric sulphate is the iron compound used and soda ash the alkali, the reaction which occurs when the mixed materials are brought into water may be represented by the following equation:—

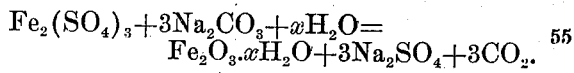
$$Fe_2(SO_4)_3 + 3Na_2CO_3 + xH_2O =$$
$$Fe_2O_3.xH_2O + 3Na_2SO_4 + 3CO_2.$$

When green vitrol and soda ash are used the following equations represent the reactions—

1. 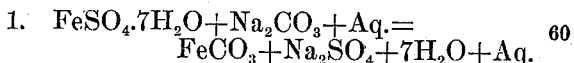
$$FeSO_4.7H_2O + Na_2CO_3 + Aq. =$$
$$FeCO_3 + Na_2SO_4 + 7H_2O + Aq.$$

2. 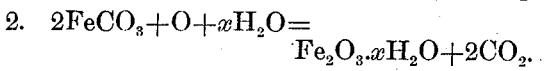
$$2FeCO_3 + O + xH_2O =$$
$$Fe_2O_3.xH_2O + 2CO_2.$$

The following examples illustrate the invention.

1. A quantity of finely ground ferric sulphate containing 400 kilos of $Fe_2(SO_4)_3$ is mixed intimately with a quantity of finely ground soda ash containing 318 kilos of $Na_2CO_3$. The mixture thus produced is introduced while stirring into say, 30,000 litres of water at ordinary temperature.

2. A quantity of finely ground ferric sulphate containing 400 kilos of $Fe_2(SO_4)_3$ is mixed intimately with a quantity of finely ground soda ash containing say 750 kilos of sodium carbonate. The mixture thus produced is introduced while stirring into say 40,000 litres of water at ordinary temperature. The hydrated ferric oxide is thus obtained suspended in an alkaline solution.

3. A quantity of finely ground ferrous sulphate (green vitriol) containing 278 kilos of $FeSO_4.7H_2O$ is mixed intimately with a quantity of finely ground soda ash containing 106 kilos of sodium carbonate. The mixture thus produced is introduced while stirring into say 15,000 litres of water. Air is blown through the solution until a sample shows that the ferric oxide is substantially free from ferrous oxide or ferrous carbonate.

4. A quantity of finely ground ferrous sulphate containing 278 kilos of $FeSO_4.7H_2O$ is mixed intimately with a quantity of finely ground soda ash containing say 300 kilos of sodium carbonate. The mixture thus produced is introduced while stirring into say 18,000 litres of water at ordinary temperature. Air is blown through the suspension until a sample shows that the ferric oxide is substantially free from ferrous oxide or ferrous carbonate. The hydrated ferric oxide is thus obtained suspended in an alkaline solution.

The oxidation of ferrous carbonate or ferrous hydroxide is facilitated by the presence of excess of alkali.

The suspensions obtained according to this invention are easily separated from liquid in which they are suspended, or from other solid matters suspended with them in liquid, and the chemical activity is relatively increased.

Having thus described the nature of the said invention and the best means we know of carrying the same into practical effect, we claim:—

1. A process of making a suspension of hydrated iron oxide which consists in mixing together a solid iron compound soluble in water and capable of decomposition by alkali, and a solid alkali and then bringing together water and the mixture.

2. A process of making an aqueous suspension of hydrated ferric oxide which consists in mixing together a pulverulent ferric compound soluble in water and capable of decomposition by alkali, and a pulverulent alkali and then bringing together water and the mixture.

3. A process of making an aqueous suspension of hydrated ferric oxide which consists in mixing together powdered ferric sulphate and powdered sodium carbonate and then bringing together water and the mixture.

4. A process of making an aqueous suspension of hydrated ferric oxide which consists in mixing together a pulverulent ferrous compound soluble in water and capable of decomposition by alkali, and a pulverulent alkali, bringing together water and the mixture and oxidizing the suspension thus formed.

5. A process of making an aqueous suspension of hydrated ferric oxide which consists in mixing together a pulverulent ferrous compound soluble in water and capable of decomposition by alkali, and a pulverulent alkali, bringing together water and the mixture and passing air through the suspension thus formed.

6. A process of making an aqueous suspension of hydrated ferric oxide which consists in mixing together powdered ferrous sulphate and powdered sodium carbonate, bringing together water and the mixture and oxidizing the suspension thus formed.

7. A process of making an aqueous suspension of hydrated ferric oxide which consists in mixing together powdered ferrous sulphate and powdered sodium carbonate, bringing together water and the mixture and passing air through the suspension thus formed.

8. A new article of manufacture consisting of the mixture of a powdered soluble iron compound and a powdered alkali, which mixture in the presence of water produces an aqueous suspension easily separable from liquid in which it is suspended, or from other solid matters suspended with it in liquid, and possesses relatively-high chemical activity.

In testimony whereof we have signed our names to this specification.

ERNEST WOODHOUSE SMITH.
THOMAS CAMPBELL FINLAYSON.